US011647531B2

(12) United States Patent
Luomi et al.

(10) Patent No.: US 11,647,531 B2
(45) Date of Patent: May 9, 2023

(54) CROWDSOURCING PERFORMANCE INDICATORS

(71) Applicant: HERE Global B.V., Eindhoven (NL)

(72) Inventors: Marko Luomi, Lempäälä (FI); Henri Jaakko Julius Nurminen, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 239 days.

(21) Appl. No.: 17/062,072

(22) Filed: Oct. 2, 2020

(65) Prior Publication Data
US 2021/0105794 A1 Apr. 8, 2021

(30) Foreign Application Priority Data

Oct. 4, 2019 (EP) .................................... 19201438

(51) Int. Cl.
*H04W 72/542* (2023.01)
*H04W 64/00* (2009.01)

(52) U.S. Cl.
CPC ....... *H04W 72/542* (2023.01); *H04W 64/003* (2013.01); *H04W 64/006* (2013.01)

(58) Field of Classification Search
CPC ........... H04W 72/1231; H04W 64/003; H04W 64/006; H04W 64/00; H04W 72/542
USPC ........................................................ 370/252
See application file for complete search history.

(56) References Cited

U.S. PATENT DOCUMENTS

| 9,491,655 | B2 | 11/2016 | Gao et al. |
| 11,037,024 | B1* | 6/2021 | Ratti ..................... G06V 10/945 |
| 2014/0179237 | A1* | 6/2014 | Gao ...................... H04W 4/025 |
| | | | 455/67.11 |
| 2015/0242815 | A1 | 8/2015 | Velasco |
| 2016/0071048 | A1* | 3/2016 | Gujar ............. G06Q 10/063112 |
| | | | 705/7.14 |
| 2018/0206136 | A1 | 7/2018 | Chow et al. |

(Continued)

FOREIGN PATENT DOCUMENTS

WO   WO 2019/141347 A1   7/2019

OTHER PUBLICATIONS

Blohm, I. et al., "How to Manage Crowdsourcing Platforms Effectively", University of St. Gallen, Universitat Kasselm Written Institute for Family Business, dated (Oct. 2017).

(Continued)

*Primary Examiner* — Rownak Islam
(74) *Attorney, Agent, or Firm* — Jeffrey R Moisan; Here Global B.V.

(57) ABSTRACT

A method is disclosed that includes gathering one or more pieces of crowdsourcing information indicative of one or more positions at which the at least one mobile device is located during the gathering. The method also includes collecting one or more performance indicators indicative of measurable information associated with the gathering of the one or more pieces of crowdsourcing information. The one or more performance indicators enable an evaluation of the gathering of the one or more pieces of crowdsourcing information. The method further includes providing the collected one or more performance indicators. An according apparatus, computer program and system are also disclosed.

19 Claims, 3 Drawing Sheets

(56) References Cited

U.S. PATENT DOCUMENTS

2018/0262991 A1    9/2018  Rao et al.
2020/0089848 A1*   3/2020  Abdelaziz .............. G06N 20/00

OTHER PUBLICATIONS

Celis, E. et al., "Adaptive Crowdsourcing for Temporal Crowds", Xerox Research Center India, dated (May 13-17, 2013).
Cullina, E. et al., "Measuring the Crowd—A Preliminary Taxonomy of Crowdsourcing Metrics", J.E. Cairness School of Business & Economics Newcastle, dated (Aug. 19-21, 2015).
Drapeau, R. et al., "Microtalk: Using Argumentation to Improve Crowdsourcing Accuracy", University of Washington, Department of Computer Science and Engineering, dated (2016).
Venetis, P. et al., "Max Algorithms in Crowdsourcing Environments", Stanford University, (undated).
Extended European Search Report for Application No. 19201438.9 dated Mar. 11, 2020.
Office Action for European Application No. 19201438.9 dated Mar. 3, 2022, 4 pages.

* cited by examiner

CROWDSOURCING PERFORMANCE INDICATORS

CROSS-REFERENCE TO RELATED APPLICATIONS

This application claims priority to European Application No. 19201438.9, filed Oct. 4, 2019, the entire contents of which are incorporated herein by reference.

FIELD OF THE DISCLOSURE

The following disclosure relates to the field of positioning, or more particularly relates to systems, apparatuses, and methods for enhancing a crowdsourcing of positioning data at least partially based on radio signals.

BACKGROUND

Such systems for (e.g. network) positioning may for instance be based on crowdsourcing, meaning that a (potentially large) number of devices (e.g. mobile devices; also referred to as crowdsourcing clients) collect information about the device location and related radio environment, e.g. available access points and their signal strengths. This information is then sent to a server side by the crowdsourcing clients. The server side forms a complete understanding of the radio environment, e.g. computes a radio map that can be again used for network positioning.

When deploying such a crowdsourcing solution in the field, it is important to understand how the crowdsourcing is performing. This is not only about understanding the amount of crowdsourced data, but also about the quality of the collected data and/or real behavior of the crowdsourcing client. The crowdsourcing system is often targeted to certain types of data, and it is important to understand if the distribution of the data types collected by the system is as planned.

There are problems known, e.g. to understand how well a crowdsourcing client logic related to the network positioning (such as HD-WiFi positioning) is performing. Interesting performance indicators may include the following, for example:

How the crowdsourcing client data collection triggers, how often, in which type of situations, what are the collection criteria/rules that trigger the collection;

how the crowdsourcing client is behaving, how well does the behavior in the field correspond to the planned behavior;

what are the consumptions of limited resources, such as energy, memory, and data bandwidth, do the resource consumptions comply with decided limits, and what are the decided limits typically achieved, e.g. to determine which resource is a bottleneck resource;

how much the crowdsourcing client collects data, uploads to the cloud (e.g. server) and how much data is discarded; and is the behavior different in certain (e.g. different) locations or location types? For example, compare different countries, different cities, countries with different levels of development, different building types such as shopping centers, industrial areas and residential areas, compare urban and rural areas.

Further, the performance of the crowdsourcing logic is subject to improvements, e.g. maximize the amount and quality of the crowdsourced data and/or minimize the resource consumptions of the crowdsourcing based on the feedback obtained, e.g. performance as mentioned above.

In the prior art, it is assumed that there are direct evaluation criteria for system parameters that can be found directly from the system design plan, such as number of participants, demographics of the crowd, technical soundness of the crowdsourcing platform, incentive plan, and data transmission capacity. It is disadvantageous in the prior art that it does not know any technical means for collecting such evaluation data. In summary, in the prior art it is only known to compare system parameter values of different crowdsourcing systems.

SUMMARY OF SOME EXEMPLARY EMBODIMENTS

However, known approaches analyze collected crowdsourcing data at a positioning cloud in order to understand the client performance. Typically, this crowdsourcing data includes e.g. position estimates and its uncertainty and radio measurements such as a list of observed WiFi Access Points and BLE (Bluetooth Low Energy) beacons (e.g. BLE tags) and their received signal strengths. However, evaluating of crowdsourcing performance, and/or improving the crowdsourcing, is not considered. In the prior art, when to collect crowdsourcing data is further determined by a user of the respective mobile device, simply by starting a crowdsourcing application.

Such an analysis of known approaches might not reveal all the interesting aspects of the crowdsourcing collection (e.g. energy consumption, whether the user was walking, running, driving, or travelling by train during the data collection, was the collection triggered by the user using GNSS (Global Navigation Satellite System) positioning or by the phone detection high-priority collection area, whether the user was actively using the phone during collection, etc.). Furthermore, such an analysis does not automatically suggest improvements to the crowdsourcing logic.

It is thus, inter alia, an object of the invention to enhance the gathering (e.g. collecting) of crowdsourcing information enabling an enhanced usage of such gathered crowdsourced information.

According to a first exemplary aspect of the present invention, a method is disclosed, the method comprising:

gathering one or more pieces of crowdsourcing information indicative of at least one or more positions at which the at least one mobile device is located during the gathering;

collecting one or more performance indicators indicative of measurable information associated with the gathering of the one or more pieces of crowdsourcing information, wherein the one or more performance indicators enable an evaluation of the gathering of the one or more pieces of crowdsourcing information; and providing the collected one or more performance indicators.

This method may for instance be performed and/or controlled by a mobile device, e.g. a mobile terminal. For instance, the method may be performed and/or controlled by using at least one processor, or a module, or a chip of the mobile device. Such a mobile device may for instance be a smartphone, tablet, wearable, IoT (Internet-of-Things) device, tag-device, low-capability device, to name but a few non-limiting examples.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a second exemplary aspect of the present invention, a method is disclosed, the method comprising:
  receiving one or more performance indicators indicative of measurable information associated with a gathering of one or more pieces of crowdsourcing information, wherein the one or more performance indicators enable an evaluation of the gathering of the one or more pieces of crowdsourcing information;
  determining improvement information indicative of one or more control parameters associated with a gathering of the one or more further pieces of crowdsourcing information, wherein the improvement information is determined based, at least partially, on the one or more performance indicators; and
  providing the improvement information.

This method may for instance be performed and/or controlled by an apparatus, for instance a server or a server cloud. Alternatively, this method may be performed and/or controlled by more than one apparatus, for instance a server cloud comprising at least two servers. For instance, the method may be performed and/or controlled by using at least one processor, or a module, or a chip of the server or the server cloud.

According to a further exemplary aspect of the invention, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a third exemplary aspect of the invention, a system is disclosed, comprising: at least one mobile device (or a plurality of mobile devices) according to the first exemplary aspect of the invention as disclosed above, and at least one apparatus (e.g. a server or a server cloud) according to the second exemplary aspect of the invention as disclosed above, performing and/or controlling the methods according to the first and second exemplary aspect of the present invention together.

In the following, exemplary features and exemplary embodiments of all aspects of the present invention will be described in further detail.

One or more technical means, e.g. comprised by the at least one mobile device, for gathering and/or collecting the crowdsourcing and/or performance data (represented by the crowdsourcing information and/or the one or more performance indicators) are proposed.

The at least one mobile device may for instance be portable (e.g. weigh less than 3, 2, 1, 0.5, 0.2 kg or less). Such a mobile device may for instance comprise or be connectable to a display for displaying information, e.g. a route that is guided/navigated to a user, to name but one non-limiting example. The mobile device may for instance comprise or be connectable to means for outputting sound, e.g. in the form of spoken commands or information. The mobile device may for instance comprise or be connectable to one or more sensors for determining the devices position, such as for instance a GNSS receiver, in the form of a GPS (Global Positioning System) receiver. The mobile device may for instance comprise or be connectable to one or more sensors, e.g. in the form of an accelerometer and/or a gyroscope for gathering (e.g. measuring) further information. The mobile device may for instance comprise or be connectable to a receiver and/or a transmitter (e.g. a transceiver) for receiving and/or sending information. For instance, the mobile device may comprise one or more radio receivers (e.g. radio transceivers) to gather measurements based on GNSS- or non-GNSS-based positioning signals, which may for instance enable a coarse position estimate indicative of the devices position to be determined or triggered to be determined, and/or to be comprised by one or more pieces of crowdsourcing information. The mobile device may for instance be suitable for outdoor and/or indoor navigation respectively positioning. The mobile device may for instance comprise various other components like a user interface for receiving user input.

The one or more pieces of crowdsourcing information are gathered by the at least one mobile device. The one or more pieces of crowdsourcing information are indicative of one or more positions (or position estimates) at which the at least one mobile device is located, e.g. during the gathering. The gathering is performed and/or controlled by the at least one mobile device. The one or more pieces of crowdsourcing information may for instance be gathered based on one or more radio signals observable at one or more certain locations, e.g. within an area, at which the at least one mobile device is located. The one or more pieces of crowdsourcing information may for instance be indicative of one or more parameters associated with the one or more radio signals and/or one or more radio nodes. The one or more pieces of crowdsourcing information may for instance comprise or represent the actual crowdsourced payload that was gathered. The one or more pieces of crowdsourcing information may for instance further be indicative of a location at which the respective crowdsourcing information was gathered (e.g. measured), and observable radio signals, and/or observable radio node(s) (e.g. represented by their respective identifier(s)), and optionally the respective signal strengths that is observable.

For instance, different data types may be gathered as the one or more pieces of crowdsourcing information. According to example embodiments of all exemplary aspects, e.g. a shopping center may request such one or more pieces of crowdsourcing information to be gathered, e.g. to determine on which consumer segments their customers belong to. It may for instance be requested, e.g. from the at least one server, that a respective mobile device or a plurality of mobile devices according to the first exemplary aspect gather one or more pieces of crowdsourcing information indicative of one or more positions, e.g. within the shopping center. It is enabled to detect the respective mobile device user's visit to the shopping center and further, e.g. to minimize unnecessary position requests when the one or more performance indicators collected with the one or more pieces of crowdsourcing information are evaluated and respective improvement information are determined, e.g. by the at least one apparatus according to the second exemplary aspect of the present invention.

Another example embodiment of all exemplary aspects may for instance be that a retail store requests to gather one or more pieces of crowdsourcing information to be enabled to determine how the customers (e.g. users of respective mobile devices according to the first exemplary aspect) move in the retail store.

According to another example embodiment of all exemplary aspects, e.g. a car navigator software provider may for instance request to gather one or more pieces of crowdsourcing information to be enabled to determine incidents related to traffic, e.g. road constructions sites, traffic disruption, or the like, to name but a few non-limiting examples. For instance, the respective improvement information may enable to accelerate collection of one or more subsequent pieces of crowdsourcing information to be gathered in case such an incident is detected. In this way, the car navigator software provider may for instance be enabled to deliver up-to-date information to the users.

The gathering of the one or more pieces of crowdsourcing information may for instance be performed and/or controlled according to a certain rule or mode. Such a certain rule or mode may for instance be represented by one or more parameters to be considered by the at least one mobile device, in particular for the gathering of the one or more pieces of crowdsourcing information. Such a certain rule or mode may for instance comprise one or more parameters to be set. The one or more parameters may for instance define one or more conditions and/or values for the at least one mobile device. The at least one mobile device may for instance set such one or more parameters (e.g. specifying application and/or hardware parameters of the at least one mobile device) so that the gathering of the one or more pieces of crowdsourcing information is adjustable by such one or more parameters. Such a certain rule or mode may for instance be obtained, e.g. by receiving such a certain rule and/or mode (e.g. from at least one apparatus performing and/or controlling the method according to the second exemplary aspect of the present invention). The at least one apparatus performing and/or controlling the method according to the second exemplary aspect of the present invention may for instance represent the crowdsourcing collection logic. Further, it may for instance coordinate the gathering of the one or more pieces of crowdsourcing information.

In this specification, exemplary features and exemplary embodiments of all aspects of the present invention with respect to the one or more pieces of crowdsourcing information equally apply to the one or more further pieces of crowdsourcing information. Further, exemplary features and exemplary embodiments relating to the one or more pieces of crowdsourcing information, such as the one or more performance indicators, equally also relate to the one or more further pieces of crowdsourcing information.

An area may for instance be a geographic area, such as a country, city, public place, industrial area, urban area, rural area, or a combination thereof, to name but a few non-limiting examples. An area may for instance be defined by or be a part of a venue. Such a venue may for instance be a building, shopping mall, office complex, public accessible location (e.g. station, airport, university or the like), to name but a few non-limiting examples.

One or more radio nodes may for instance be comprised by an area and/or a venue, e.g. by an infrastructure of the venue and/or area, or a part of it. Such a radio node of the one or more radio nodes may for instance be a radio node, e.g. of the area and/or venue. Such a radio node may for instance be used for (indoor) positioning and/or floor detection, e.g. according to BT- (Bluetooth) and/or BLE- (Bluetooth Low Energy) specification, or may for instance be a Wi-Fi Access Point for indoor positioning and/or floor detection, e.g. according to the WLAN- (Wireless Local Area Network) specification, to name but a few non-limiting examples. Further, such a radio node may for instance be part of a cellular communication network. For instance, such a radio node of the cellular communication network may for instance be a base station.

Such one or more radio nodes may for instance sent the one or more radio (e.g. frequency) signals. Such a radio node (e.g. WiFi access point, beacon device, or a combination thereof, to name but a few non-limiting examples), e.g. of the area and/or venue, may for instance comprise or be connectable to a transceiver, e.g. according to the BT-, BLE, and/or WLAN (Wireless Local Area Network)-specification to provide wireless-based communication. Each radio node of the one or more radio nodes, e.g. of the area and/or venue, may for instance use such a transceiver for transmitting and/or broadcasting one or more signals, e.g. comprising one or more information (e.g. one or more identifiers), such as a SSID (Service Set Identifier) of the respective radio node of the one or more radio nodes.

One or more radio signals sent by such one or more radio nodes may for instance be gathered (e.g. measured) by the at least one mobile device. For instance, based on the one or more radio signals, one or more pieces of fingerprint information may for instance be formed. A respective fingerprint information may for instance be indicative of one or more observation reports of signals sent by one or more radio nodes observable at a certain location. For example, the radio transmission parameters of a parametric radio model of a radio positioning support device may at least partially correspond to and/or be determined based on one or more radio transmission parameters associated with this radio node of the one or more radio nodes, wherein the one or more radio transmission parameters associated with this radio node of the one or more radio nodes may for example be represented by and/or contained in the one or more observation reports (e.g. one or more observation reports associated with the radio node and/or an (e.g. adjacent) radio node of the one or more radio nodes), e.g. in the form of one or more pieces of fingerprint information. Such a fingerprint information, or a plurality of such pieces of fingerprint information may for instance be comprised or be represented by the one or more pieces of crowdsourcing information and/or one or more further pieces of crowdsourcing information. Further, the one or more pieces of crowdsourcing information and/or one or more further pieces of crowdsourcing information for instance comprise or represent additional information, e.g. a coarse position estimate being indicative of a position (estimate) that is estimated based on cellular and/or GNSS signals, and which represents an estimation of a location at which the one or more pieces of crowdsourcing information and/or one or more further pieces of crowdsourcing information were gathered, to name but a few non-limiting examples.

The one or more pieces of crowdsourcing information and/or one or more further pieces of crowdsourcing information, and/or a respective fingerprint information comprised by the one or more pieces of crowdsourcing information and/or one or more further pieces of crowdsourcing information, may for instance at least be indicative of one or more identifiers of one or more radio nodes which respective signals are observable at a certain location at which the respective crowdsourcing information is gathered. For instance, based on such one or more identifiers of the one or more radio nodes, a respective location of a respective radio node may for instance be determined, e.g. based on a look-up table to name but one non-limiting example.

Further, based on a respective fingerprint information gathered e.g. by the at least one mobile device, a location may for instance be determined at least partially based on an indoor radio map of an area since it may for instance be derivable from a radio map (or an indoor radio map) at which specific location a certain selection of one or more radio nodes of the area and/or venue are observable. It will be understood that for instance in case a respective fingerprint information is further indicative of one or more radio transmission parameters, the respective location of the at least one mobile device may for instance be determined (e.g. estimated) more accurately.

A respective fingerprint information comprised by the one or more pieces of crowdsourcing information and/or one or more further pieces of crowdsourcing information, or a respective crowdsourcing information of the one or more pieces of crowdsourcing information and/or one or more further pieces of crowdsourcing information may for instance be indicative of one or more observation reports of radio signals sent by (the) one or more radio nodes observable at a certain location. For example, such observation reports may comprise radio transmission parameters. Such radio transmission parameters may for instance be of a parametric radio model of a radio positioning support device (e.g. represented by the one or more radio nodes) may at least partially correspond to and/or be determined based on one or more radio transmission parameters associated with this radio node of the one or more radio nodes, wherein the one or more radio transmission parameters associated with this radio node of the one or more radio nodes may for example be represented by and/or contained in the one or more observation reports (e.g. one or more observation reports associated with the radio node and/or an (e.g. adjacent) radio node of the one or more radio nodes), e.g. in the form of a fingerprint information, or comprised by the one or more pieces of crowdsourcing information and/or one or more further pieces of crowdsourcing information.

The gathering of the one or more pieces of crowdsourcing information and/or one or more further pieces of crowdsourcing information may for instance be performed and/or controlled based, at least partially, on one or more control parameters. For instance, such one or more control parameters may for instance be part of or comprised by a rule and/or mode. Additionally or alternatively, such one or more control parameters may for instance be part of received improvement information. Such an improvement information may for instance enable tuning of the gathering of the one or more further pieces of crowdsourcing information. A crowdsourcing system benefits from data where a person (e.g. user of the at least one mobile device) may for instance enter an area (e.g. a building or a venue), but such one or more pieces of crowdsourcing information cannot be gathered (e.g. collected) all the time to capture these moments (e.g. due to increased energy consumption of the at least one mobile device, to name but one non-limiting example). For instance, three heuristic crowdsourcing starting rules and/or modes may for instance predict such important crowdsourcing moments: e.g. represented by rules A, B and C. Some clients (represented e.g. by the at least one mobile device) may for instance be operated according to rule A, later with rule B, and after that, with rule C. Then, according to example embodiments of all exemplary aspects of the present invention, such one or more pieces of crowdsourcing information (e.g. crowdsourcing data) are gathered according to rules A, B, and/or C. Such one or more pieces of crowdsourcing information may for instance be provided to the at least one apparatus according to the second exemplary aspect of the present invention, e.g. to be analyzed. The at least one apparatus according to the second exemplary aspect of the present invention may for instance determine (e.g. choose) a rule (e.g. at least partially automatically) that delivered high data quality, and/or low energy consumption on the side of the client(s) (e.g. the at least one mobile device), and/or mixing the rules A, B, and/or C for (e.g. further) gathering of one or more pieces of crowdsourcing information on the side of the client(s) (e.g. the at least one mobile device) which may for instance result in even better results, to name but a few non-limiting examples.

According to an exemplary embodiment of the first exemplary aspect of the present invention, the method further comprises:

receiving improvement information indicative of one or more control parameters associated with a gathering of one or more further pieces of crowdsourcing information that are to be gathered subsequent to the one or more pieces of crowdsourcing information;

tuning the gathering of the one or more further pieces of crowdsourcing information based at least partially on the received improvement information.

According to an exemplary embodiment of the first exemplary aspect of the present invention, the method further comprises:

gathering the one or more further pieces of crowdsourcing information at least partially based on the received improvement information.

As disclosed above, the at least one apparatus according to the second exemplary aspect of the present invention may for instance determine (e.g. choose) a rule and/or mode (e.g. at least partially automatically) that delivered high data quality, and/or low energy consumption on the side of the client(s) (e.g. the at least one mobile device; further: represented by the one or more performance indicators), and/or mixing the rules A, B, and C for gathering of one or more further pieces of crowdsourcing information on the side of the client(s). Such information may for instance be comprised or represented by the improvement information. Thus, prior to receiving the improvement information, e.g. from the at least one apparatus performing and/or controlling the method according to the second exemplary aspect of the present invention, this at least one apparatus may for instance form results of an analysis to improve the gathering of one or more further pieces of crowdsourcing information into an/one or more pieces of improvement information to be provided (back) to the client(s), e.g. the at least one mobile device according to the first exemplary aspect of the present invention. Then, the at least one mobile device can gather (e.g. further) one or more pieces of crowdsourcing information considering the provided (e.g. received) improvement information.

The received improvement information may for instance be based on the collected one or more performance indicators. The one or more performance indicators are indicative of measurable information associated with the gathering of the one or more pieces of crowdsourcing information and/or with the gathering of the one or more further pieces of crowdsourcing information. The one or more performance indicators are intended for enabling an evaluation of the gathering of the one or more pieces of crowdsourcing information and/or one or more further pieces of crowdsourcing information. In particular, in case such one or more performance indicators are obtained (e.g. received) from a plurality of mobile device (e.g. according to the first exemplary aspect of the present invention), these one or more performance indicators may for instance be evaluated in relation to each other. Such an evaluation may for instance be performed and/or controlled by the at least one apparatus according to the second exemplary aspect of the present invention, and/or by a crowdsourcing collection logic coordinating the gathering of the one or more pieces of crowdsourcing information and/or one or more further pieces of crowdsourcing information, or a plurality of gatherings of one or more pieces of crowdsourcing information performed and/or controlled by a plurality of mobile device (e.g. according to the first exemplary aspect of the present invention).

The crowdsourcing logic may for instance provide an application that is run on the at least one mobile device, or—given user consent in advance to participate in crowdsourcing—be provided from a server or server cloud, e.g. that is a positioning server (e.g. represented by the at least one apparatus performing and/or controlling the method according to the second exemplary aspect of the present invention). The crowdsourcing logic may for instance provide one or more control parameters according to which such one or more pieces of crowdsourcing information are gathered or to be gathered by the at least one mobile device. Such one or more control parameters may for instance be represented by aforementioned rule(s) and/or mode(s), e.g. (e.g. adaptively) defined. Such one or more control parameters may for instance be configured according to improvement information, obtainable (e.g. receivable) by the at least one mobile device, e.g. from the at least one apparatus according to the second exemplary aspect of the present invention.

The one or more performance indicators may for instance be indicative of a behavior of measurable information according to which the one or more pieces of crowdsourcing information were gathered.

The one or more performance indicators may for instance be indicative of measurable information for a crowdsourcing collection logic. The one or more performance indicators may for instance represent one or more consequences of certain system parameter values to the realized crowdsourcing system. Such one or more consequences may for instance be collected (e.g. measured), e.g. during the gathering of the crowdsourcing information. Such one or more consequences may for instance result in improvements, as listed in the following with respect to the improvement information.

The one or more performance indicators may for instance be not directly found (e.g. derivable) from the one or more pieces of crowdsourcing information and/or one or more further pieces of crowdsourcing information that are gathered. Further, the one or more performance indicators may for instance be needed to be explicitly collected, e.g. according to all exemplary aspects of the present invention. For instance, it may not be possible to say which portion of data collection represented by the gathered one or more pieces of crowdsourcing information and/or one or more further pieces of crowdsourcing information is initiated based on a certain rule and/or mode e.g. according to the crowdsourcing logic. This may for instance depend on statistical characteristics of a user of the at least one mobile device. For instance, the performance of the gathering of the one or more pieces of crowdsourcing information and/or one or more further pieces of crowdsourcing information may depend on how users of a plurality of mobile devices, wherein such mobile device all perform and/or control the method according to the first exemplary aspect, typically behave in certain scenarios. This information may only be collected (e.g. measured), e.g. by monitoring the realized crowdsourcing system's operation respectively the gathering of the one or more pieces of crowdsourcing information and/or one or more further pieces of crowdsourcing information. Then, based on such collected information of a plurality of mobile devices, aforementioned statistical characteristics may for instance be derivable. In other words, the one or more performance indicators may for instance be collected, e.g. by measuring one or more consequences of certain parameters in relation to certain performance criteria (e.g. as disclosed with respect to the performance indicators below) of the crowdsourcing.

Furthermore, the method according to all exemplary aspects of the present invention proposes e.g. to, at least partially, automatically improve the crowdsourcing performance, e.g. by tuning the system parameters (e.g. used for the gathering of the one or more further pieces of crowdsourcing information) based on the obtained performance indicators (e.g. performance feedback data).

According to an exemplary embodiment of all exemplary aspects of the present invention, at least partially automatically decisions are made by determining improvement information comprising or representing when to collect data, thus, performing and/or controlling gathering of one or more pieces of crowdsourcing information and/or one or more further pieces of crowdsourcing information is to be performed, e.g. by the at least one mobile device according to the first exemplary aspect of the present invention.

According to an exemplary embodiment of all exemplary aspects of the present invention, a crowdsourcing logic system is enabled, e.g. such a crowdsourcing logic system may specifically be used for radio network-based positioning crowdsourcing application.

The collected one or more performance indicators are providing, e.g. by outputting (e.g. sending) the collected one or more performance indicators. The collected one or more performance indicators may for instance be provided to a positioning server or server cloud (e.g. the at least one apparatus according to the second exemplary aspect of the present invention).

Further, the one or more performance indicators may for instance be provided (e.g. sent or output), e.g. to an entity which is different from the at least one apparatus, and which transmits (e.g. relays) the one or more performance indicators to the at least one apparatus. The one or more performance indicators may for instance be output via a communication interface of the at least one mobile device performing and/or controlling the method according to the first exemplary aspect of the present invention. Such a communication interface may for instance comprise one or more radio transceiver (e.g. transmitter and receiver), e.g. according to WLAN, BT, BLE, cellular, or a combination thereof communication standard, to name but a few non-limiting examples.

According to an exemplary embodiment of the first exemplary aspect of the present invention, the collecting of the one or more performance indicators is performed at least partially in parallel to the gathering of the one or more pieces of crowdsourcing information, and optionally, to the gathering of the one or more further pieces of crowdsourcing information.

The collecting of the one or more performance indicators may for instance be performed and/or controlled (by the at least one mobile device) during the gathering of the one or more pieces of crowdsourcing information and/or one or more further pieces of crowdsourcing information, thus, simultaneously. It will be understood that the collecting of the one or more performance indicators may for instance overlap only a part of the time during which the at least one mobile device may for instance perform and/or control the gathering of the one or more pieces of crowdsourcing information and/or one or more further pieces of crowdsourcing information. This reduces e.g. consumption of energy, storage, and/or memory of the at least one mobile device.

According to an exemplary embodiment of the first exemplary aspect of the present invention, the method is performed and/or controlled repeatedly. The method according to the first exemplary aspect of the present invention may for instance be performed and/or controlled at least twice, by the at least one mobile device. Furthermore, the method according to the first exemplary aspect of the present invention may for instance be performed and/or controlled e.g. every time the at least one mobile device is requested (e.g. by its user, or by a request obtained e.g. from the at least one apparatus performing and/or controlling the method according to the second exemplary aspect of the present invention), to gather crowdsourcing information, to name but a few non-limiting examples.

The crowdsourcing logic may for instance coordinate the performing and/or controlling of respective method(s) according to the first exemplary aspect of the present invention (in particular a plurality of gatherings of one or more pieces of crowdsourcing information) by a plurality of mobile device. Each mobile device of the plurality of mobile devices may for instance be a mobile device according to the first exemplary aspect of the present invention. Such a crowdsourcing logic may for instance be part of the at least one apparatus performing and/or controlling the method according to the second exemplary aspect of the present invention.

Such improvement information may for instance be the basis for tuning of the gathering of the one or more pieces of crowdsourcing information, and/or for tuning of a further gathering of one or more pieces of crowdsourcing information to be performed and/or controlled subsequentially.

According to an exemplary embodiment of all exemplary aspects of the present invention, the one or more performance indicators comprise one or more of the following:
i) time of the gathering of the one or more pieces of crowdsourcing information and/or the one or more further pieces of crowdsourcing information;
ii) frequency of the gathering of the one or more pieces of crowdsourcing information and/or the one or more further pieces of crowdsourcing information;
iii) data amount associated with the gathering of the one or more pieces of crowdsourcing information and/or the one or more further pieces of crowdsourcing information;
iv) energy consumption associated with the gathering of the one or more pieces of crowdsourcing information and/or the one or more further pieces of crowdsourcing information;

v) motion of the at least one mobile device during the gathering of the one or more pieces of crowdsourcing information and/or the one or more further pieces of crowdsourcing information;

vi) locations at which the gathering of the one or more pieces of crowdsourcing information and/or the one or more further pieces of crowdsourcing information took place;

vii) a rule and/or mode according to which the one or more pieces of crowdsourcing information and/or the one or more further pieces of crowdsourcing information were gathered; and viii) one or more pieces of state information indicative of one or more system state parameters of the at least one mobile device.

The one or more performance indicators that are collected (e.g. measured) may for instance comprise or represent one or more of the performance indicator i) to viii), or multiple (e.g. at least two) of the same parameter i) to viii) collected during different gatherings of crowdsourcing information (e.g. gathered at different locations, to name but one non-limiting example), or a combination thereof.

In particular, performance indicator vi) of the locations of the gathering of the crowdsourcing information may for instance further represent a variance of one or more collection locations.

The rule and/or mode may for instance be pre-defined. The rule and/or mode may for instance be pre-defined by the crowdsourcing logic. As disclosed above, the crowdsourcing logic may for instance trigger the gathering of the crowdsourcing information, e.g. by such a rule and/or mode.

The one or more pieces of state information may for instance represent one or more system states (represented by one or more system state parameters) of the at least one mobile device in which the at least one mobile device was set during the gathering of the one or more pieces of crowdsourcing information. For instance, such one or more system state parameters may for instance include or comprise a UI (User Interface) state, e.g. whether the screen of the at least one mobile device was turned on/off, a battery state, or the like, to name but a few non-limiting examples.

According to an exemplary embodiment of the first exemplary aspect of the present invention, the method further comprises:

providing the crowdsourcing information, wherein the collected one or more performance indicators are provided by being appended to the one or more pieces of crowdsourcing information and/or the one or more further pieces of crowdsourcing information.

The providing of the respective crowdsourcing information and the providing of the collected one or more performance indicators may be performed and/or controlled together, e.g. by providing the one or more pieces of crowdsourcing information and/or the one or more further pieces of crowdsourcing information and e.g. appending the one or more collected performance indicators to the one or more pieces of crowdsourcing information.

According to example embodiments of the second exemplary aspect of the present invention, one or more performance indicators are received. The received one or more performance indicators are provided by the at least one mobile device, or by a plurality of mobile devices according to the first exemplary aspect of the present invention. As described in detail above according to example embodiments in particular of the first exemplary aspect of the present invention, the one or more performance indicators may for instance be one or more of the performance indicators i) to viii).

The improvement information may be indicative of one or more control parameters associated with a gathering of the one or more pieces of crowdsourcing information and/or the one or more further pieces of crowdsourcing information. The improvement information may be determined, e.g. by analyzing the received performance indicators, and then forming results to improve the gathering of one or more further pieces of crowdsourcing information (e.g. based on quality, data amount, or the like) into one or more pieces of improvement information. The improvement information are provided (e.g. output) e.g. to at least one mobile device (e.g. the mobile device performing and/or controlling the method of the first exemplary aspect of the present invention), and/or to the plurality of mobile device, as disclosed above.

The improvement information may for instance comprise or represent one or more of the following improvements or criteria:

Reducing (or increasing) the gathering of one or more pieces of crowdsourcing information and/or one or more further pieces of crowdsourcing information (e.g. data amount that is gathered), e.g. if a collected (e.g. measured) performance indicator is indicative of a consumption (e.g. energy consumption, see performance indicator iv)) is too high (or low);

Relaxing (or tightening) criteria indicative of entering a certain state for gathering the one or more pieces of crowdsourcing information and/or one or more further pieces of crowdsourcing information, e.g. if the proportion of the amount of data gathered as crowdsourcing information in a respective state is e.g. smaller (or higher) than the planned proportion;

Relaxing (or tightening) criteria indicative of entering a certain state for gathering of the one or more pieces of crowdsourcing information and/or one or more further pieces of crowdsourcing information, e.g. if the quality of the data collected as crowdsourcing information (derivable based at least partially on any of performance indicators i) to viii)) in this state is high (or low), thus, above or below a pre-defined threshold value;

Relaxing (or tightening) criteria of entering a certain state for gathering of the one or more pieces of crowdsourcing information and/or one or more further pieces of crowdsourcing information e.g. that produce more (or less) desired data types (e.g. indoor/outdoor data (represented by the crowdsourcing information) of an area, data gathered alongside with positioning, to name but a few non-limiting examples) than expected; and Relaxing (or tightening) a criteria in areas where many clients produce little (or much) data.

Such criteria may for instance be part of aforementioned rule(s) and/or mode(s). The criteria may for instance define one or more control parameters based on which, at least partially, the gathering of the one or more pieces of crowdsourcing information can be performed and/or controlled by the at least one mobile device according to the first exemplary aspect of the present invention.

According to an exemplary embodiment of the second exemplary aspect of the present invention, the improvement information is determined based on an artificial neural network enabling the determining of the improvement information.

Additionally or alternatively, the determining of the improvement information may for instance be tuned and/or specified and/or changed by (e.g. every) (an) iteration of determining of improvement information by such an artificial neural network.

Such an artificial neural network may for instance be trained by using a set of performance indicators as an input, wherein the set of performance indicators may have known improvement information associated with the respective performance indicator(s) of the set. Additionally or alternatively, the improvement information may be associated with the respective performance indicator(s) of the set in a manual fashion. Such a supervised machine learning method can be e.g. a Bayesian classifier, a linear classifier, a support vector machine, a k-nearest neighbor classifier, a decision tree, or a combination thereof, to name but a few non-limiting examples. For instance, such a training may for instance be performed and/or controlled prior to performing and/or controlling the method according to the first exemplary aspect of the present invention. Alternatively, such a training may for instance be part of the method according to the first exemplary aspect of the present invention.

For instance, such a training may for instance be performed and/or controlled as follows: personnel who administrate a crowdsourcing system (e.g. provided as a service, e.g. by a positioning server, such as the at least one apparatus according to the second exemplary aspect of the present invention) may for instance choose a set of performance indicators (and optionally, corresponding one or more pieces of crowdsourcing information and/or the one or more further pieces of crowdsourcing information received together with the respective performance indicators) whose respective improvement information to be derived at, is known. This choice may for instance be done manually or automatically based on some (e.g. pre-defined) rules. For each chosen performance indicator, the at least one apparatus may for instance obtain (e.g. retrieve or fetch) the respective pieces of improvement information e.g. associated with the performance indicator and/or the one or more pieces of crowdsourcing information and/or the one or more further pieces of crowdsourcing information. Then, the artificial neural network may for instance determine (e.g. compute) a respective improvement information (e.g. representing one or more improvements to be suggested to the at least one mobile device intended to gather (further) crowdsourcing information), and further, inputs the data, e.g. as a vector (e.g. crowdsourcing information, performance indicator(s), improvement information), to a training method to train the artificial neural network. When a representative enough amount of such trainings pairs has been input to the training method, the artificial neural network may for instance be enabled, with a high probability, to determine the correct improvement information of (a) new received performance indicator(s).

After sufficient training of such an artificial neural network, the artificial neural network may derive one or more pieces of improvement information based on one or more inputs of one or more performance indicators.

After the training part, the at least one apparatus according to the second exemplary aspect of the present invention may for instance perform and/or control the method according to the second exemplary aspect of the present invention, and optionally, determine a respective improvement information.

Such a training of the artificial neural network may for instance take place prior to the performing and/or controlling of example embodiments according to all aspects of the present invention. Then, e.g. iteratively, the artificial neural network may for instance learn by using received one or more performance indicators of a plurality of mobile devices and fine-tuning the artificial neural network.

According to an exemplary embodiment of the second exemplary aspect of the present invention, the improvement information enables a tuning of the gathering of the one or more pieces of crowdsourcing information, or of a gathering of the one or more further pieces of crowdsourcing information.

According to an exemplary embodiment of the second exemplary aspect of the present invention, the improvement information represents one or more improvements of criteria enabling the gathering of the one or more pieces of crowdsourcing information to be tuned. The gathering of the one or more pieces of crowdsourcing information may for instance be the gathering of the one or more pieces of crowdsourcing information that is performed and/or controlled by the at least one mobile device according to the first exemplary aspect of the present invention. Additionally or alternatively, the improvement information represents one or more improvements of criteria enabling a further gathering of one or more pieces of crowdsourcing information to be tuned. Such a further gathering may for instance be performed and/or controlled by the at least one mobile device according to the first exemplary aspect of the present invention. The improvements or criteria represented by the improvement information may for instance be one or more of the improvements or criteria disclosed above with respect to the improvement information.

The one or more control parameters e.g. as comprised by the improvement information, may for instance be set. For instance, such one or more control parameters may for instance result in best data in terms of quality and/or quantity of the crowdsourcing information (e.g. crowdsourced data) to be gathered, e.g. by the at least one mobile device. The one or more control parameters may for instance be comprised by a respective improvement information, or a plurality of pieces of improvement information to be provided to a plurality of mobile devices (e.g. configured according to the first exemplary aspect of the present invention) to gather respective crowdsourcing information.

According to an exemplary embodiment of the second exemplary aspect of the present invention, the determining of the improvement information further comprises:
mapping the one or more performance indicators to one or more data quality and/or data quantity metrics,
wherein the improvement information is determined based on an evaluation of the data quality and/or data quantity metrics associated with the one or more performance indicators in accordance with the mapping.

The mapping may for instance be between crowdsourcing client configuration parameters and crowdsourced data quality/quantity indicators. Such crowd-sourcing client configuration parameters may for instance be represented by the one or more control parameters and/or be comprised or represented by the certain rule(s) and/or mode(s), based on which, at least partially, the at least one mobile device according to the first exemplary aspect of the present invention can gather one or more pieces of crowdsourcing information. Such crowdsourced data quality/quantity indicators may for instance be represented by one or more of the performance indicators i) to viii).

In this way, example embodiments of all aspects of the present invention enable to understand and enhance the performance of a crowdsourcing data collection logic based on a performance of a respective mobile device gathering the crowdsourcing information in the field.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
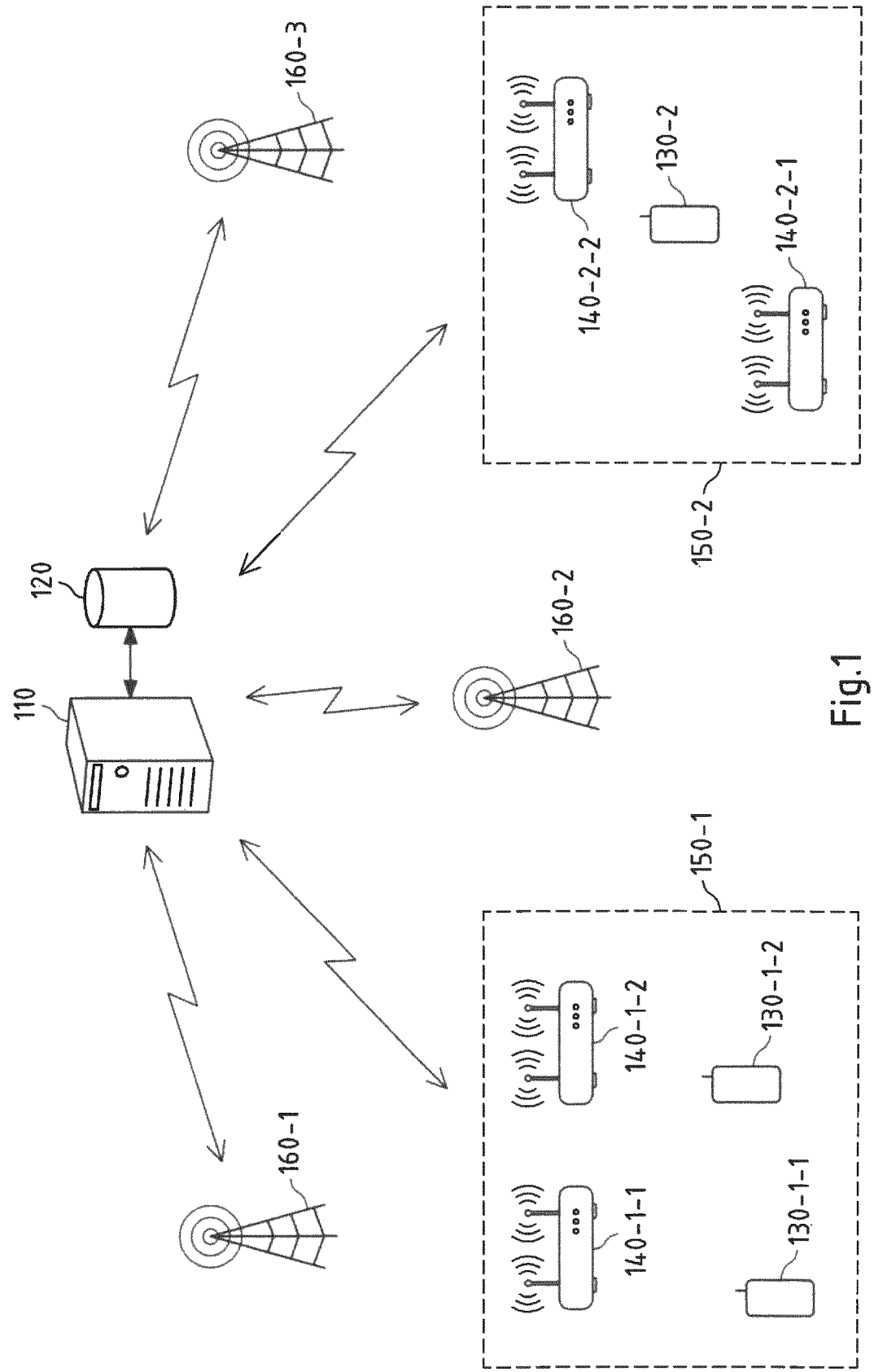
FIG. 1 a schematic block diagram of a system according to the third exemplary aspect of the present invention.

FIG. 1 is a schematic high-level block diagram of a system 100 according to an example embodiment of the present invention.

Such a system 100 may for instance represent an architecture and/or environment that is/are configured, at least partially, to perform and/or control one or more exemplary aspects of the present invention.

System 100 comprises a server 110, an optional database 120, one or more mobile devices 130 (e.g. a smartphone, tablet, wearable, IoT-device; wherein in FIG. 1 three mobile devices 130-1-1, 130-1-2 and 130-2 are exemplary shown), and areas 150-1, 150-2, which may be respective venues, and in which crowdsourcing information are to be gathered by the three mobile devices 130-1-1, 130-1-2 and 130-2.

The mobile devices 130-1-1 and 130-1-2 are located in the area 150-1. The mobile device 130-2 is located in the area 150-2. Inside the areas 1501, 150-2, one or more radio nodes (e.g. Wi-Fi access points and/or BT and/or BLE beacons, to name but a few non-limiting examples) may for instance be located and/or installed. At present, in the area 150-1 two radio nodes 140-1-1, 140-1-2 are located, e.g. installed. In the area 150-2, two radio nodes 140-2-1, 140-2-2 are located, e.g. installed.

Further, system 100 comprises three base stations 160-1, 160-2, 160-3, which may be part of a cellular communication network. Within the meaning of the present invention, such base stations 160-1, 160-2, 160-3 are considered to represent radio nodes as well. Radio signals sent by the base stations 160-1, 160-2, 160-3 may for instance be observable (e.g. receivable) within or outside of the areas 150-1, 150-2.

Based on radio signals sent by such radio nodes, e.g. WiFi access points and/or BT- and/or BLE-beacons and/or base stations e.g. of a cellular communication network, to name but a few non-limiting examples, the one or more mobile devices 130-1-1, 130-1-2, and 130-2 may for instance gather (e.g. measure) one or more pieces of crowdsourcing information. These one or more pieces of crowdsourcing information may then be provided, e.g. to the server 110, which may alternatively be embodied as a server cloud (e.g. a plurality (e.g. at least two) of servers providing a service at least partially jointly). The server 110 may for instance represent a positioning server, e.g. providing positioning service, such as determining position estimates at least partially based on a gathered (e.g. measured) fingerprint that is obtained (e.g. received from a respective mobile device) prior to the determining of the position estimate. The fingerprint may for instance comprise at least identifier(s) of radio nodes that are observable at the location at which the respective mobile device gathered the fingerprint. Then, the fingerprint may for instance be compared to a previously generated radio map, e.g. enabling a position estimate to be determined, e.g. by comparing which radio nodes' signals are or should be observable at a certain location with the identifier(s) comprised by the fingerprint, to name but one non-limiting example. In order to generate such a radio map, crowdsourcing information need to be gathered by one or more mobile devices to enable a generating of such a radio map.

Exemplary embodiments according to all aspects of the present invention enable to improve such a gathering of crowdsourcing information.

A crowdsourcing client (e.g. mobile device(s) 130) may for instance gather (e.g. collect) information indicative of measurable information (e.g. about the behavior) of the mobile device(s) 130 during the crowdsourcing collection, e.g. about the events that triggered collection of crowdsourcing information (e.g. crowdsourced data), as well as parameters (e.g. one or more control parameters) defining collection logic.

The client(s) respectively mobile device(s) 130 may for instance provide (e.g. send) the collected information (e.g. one or more pieces of crowdsourcing information) about the events that triggered collection, as well as parameters defining the collection respectively gathering of the one or more pieces of crowdsourcing information (e.g. one or more performance indicators that are collected), e.g. to the positioning cloud (e.g. server 110). The collected information (e.g. one or more performance indicators) can for example be appended to the actual crowdsourced payload (e.g. the one or more pieces of crowdsourcing information).

Figure 5:
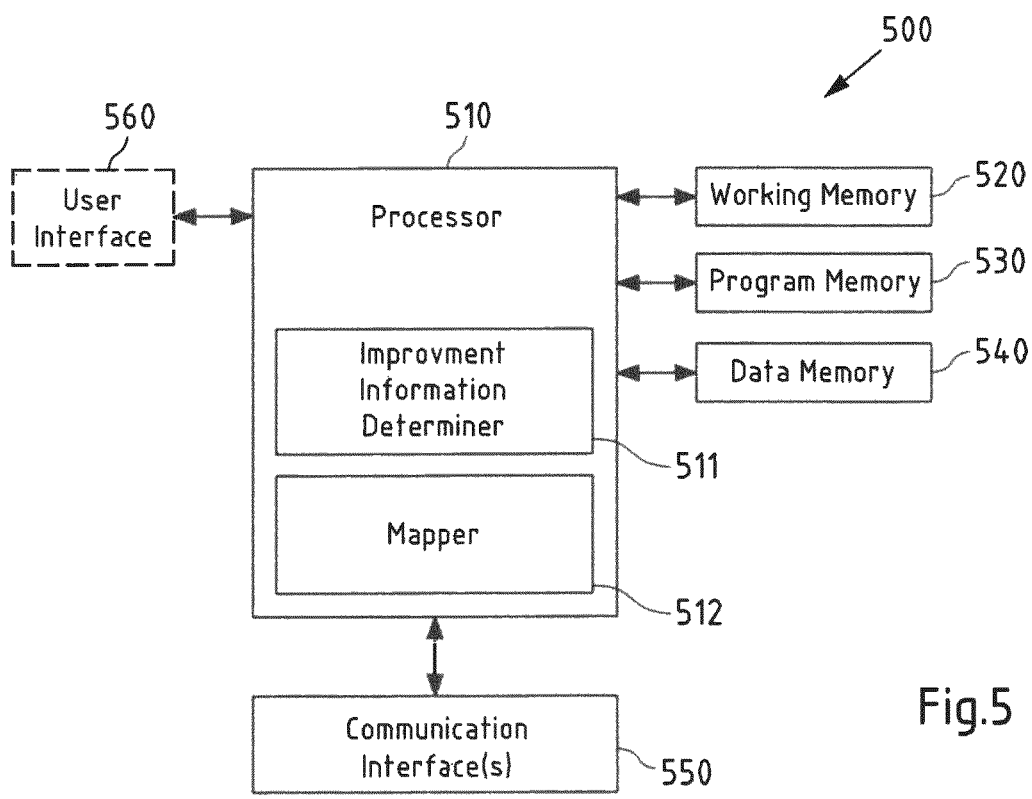
FIG. 5 a schematic block diagram of an apparatus configured to perform the method according to the second exemplary aspect of the present invention.

The positioning cloud (e.g. server 110) may for instance comprise a module (e.g. mapper 512 of apparatus 500; FIG. 5) that further analyses that information in order to create understanding the crowdsourcing client performance. Namely, analysis may be a mapping between crowd-sourcing client configuration parameters and crowd-sourced data quality/quantity indicators.

Based on this understanding, improvements (e.g. represented or comprised by one or more pieces of improvement information) to the crowdsourcing of the client (e.g. mobile device(s) 130) are provided (e.g. send), wherein the improvement(s) may for instance be suggested e.g. by automatic and/or manual inspection. In other words, the crowd-sourcing parameters (e.g. one or more control parameters) which result in the best data (e.g. crowdsourcing information) in terms of quality and quantity are used for crowd-sourcing.

The crowdsourcing performance indicators (e.g. one or more performance indicators that are collected by the mobile device(s) 130) to be collected (e.g. obtained) may for instance include or comprise one or more of the following, wherein each performance indicator may be in relation to the gathering of crowdsourcing information (e.g. during the gathering of crowdsourcing information). One or more of the following may for instance be comprised or represented by the measurable information:

- How much time was spent in different crowdsourcing modes (e.g. collection triggered by criterion set A (e.g. represented by rule A), collection triggered by criterion set B (e.g. represented by rule B), . . . );
- How much data was collected in different crowdsourcing modes;
- How much data was discarded;
- Quality indicator of collected data;
- Quality indicator of discarded data;
- Power or energy consumption estimates based on the resource usage of the device: e.g. WiFi, GNSS, sensors.
- Statistics of memory and data bandwidth consumptions;
- Device battery level during collection;
- Screen state during collection (on, off, on-time, . . . );
- Indicators of the motion state during the collection (e.g. walking, running, cycling, driving a car, train, flying, . . . );
- Indicators and/or statistics of the measurement technologies that were used to determine the crowdsourced data (e.g. GNSS, radio network based positioning, inertial sensors, barometers, map-matching, visual measurements, . . . ); Indicator on whether the crowdsourcing data collection was done alongside with positioning;
- The average collection frequency of the client, and/or average time interval between successive collection sessions;
- Indicator on whether the data was the collected indoors or outdoors; and
- The variance of the locations where the client has collected within a time window.

Improvements (e.g. represented or comprised by one or more pieces of improvement information) that may for instance be suggested based on the abovementioned performance indicators may for instance include or comprise one or more of the following:

- Reduce (Increase) the data collection limits if the measured consumptions are too high (low);
- Relax the criteria of entering certain collection state if the proportion of data collected in this state is smaller than the planned proportion;
- Relax (Tighten) the criteria of entering certain collection state if the quality of the data collected in this state is high (low);
- Relax the criteria of entering collection states that produce more desired data types (e.g. indoor/outdoor data, data collected alongside with positioning) than expected; and
- Relax the collection criteria in areas where many clients produce little data.

Configuration of above mentioned parameters defining data collection limits, state (e.g. mobile device(s) should start the gathering of the one or more pieces of crowdsourcing information) enter/exit conditions may for instance be done manually, or at least partially automatically, e.g. by providing them to the respective mobile device(s). Further, optimal values may for instance be determined (e.g. found) by applying machine learning techniques, for example naïve grid search. This may for instance be performed and/or controlled by the sever 110. In the naïve grid search different values of parameters are tested, e.g. within pre-determined period (e.g. a week), and the ones which produce the optimal data in terms of quantity and quality are considered to constitute the optimal configuration. Since dimensionality of a vector of configuration parameters is normally quite high, it may not be practical to consider the whole vector at a time for a grid-based search. Therefore, the vector of parameters may be split into relevant sub-vectors of 3-4 elements, as well as set of possible values for each of the elements may be reduced to a small size, e.g. less than 10 possible values. Alternatively, to cope with dimensionality problem, other techniques, such as genetic algorithms, can be used.

In this way, the solution according to all exemplary aspects of the present invention enables the possibility to understand and enhance the performance of the crowdsourcing data collection logic based on the field performance.

As indicated by the arrows, one or more pieces of information respectively data may for instance be transmitted between the entities of the system 100.

Figure 2:
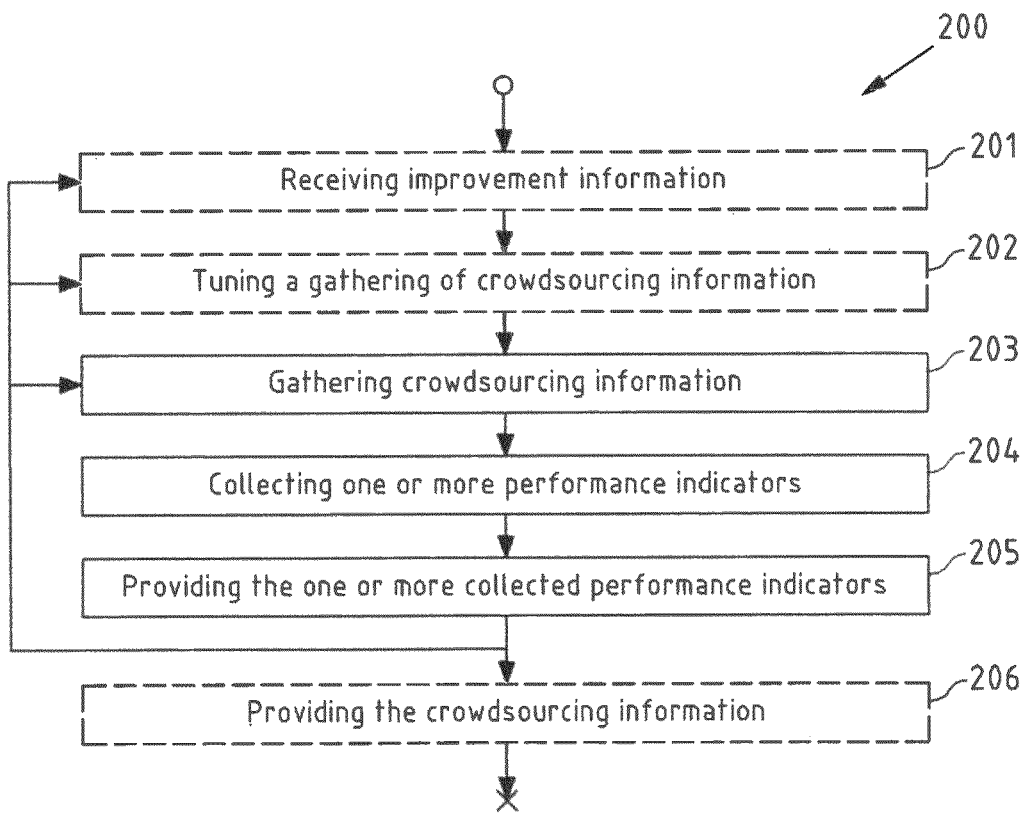
FIG. 2 a flowchart showing an example embodiment of a method according to the first exemplary aspect of the present invention.

FIG. 2 is a flowchart 200 showing an example embodiment of a method according to the first exemplary aspect of the present invention. This flowchart 200 may for instance be performed by a mobile device 130 of FIG. 1.

In an optional first step 201, improvement information are received. The step 201 may for instance be performed and/or controlled based on provided (e.g. output) improvement information from a server or server cloud (e.g. server 110 of FIG. 1), which may for instance provide the improvement information according to the step 304 of FIG. 3. The improvement information may for instance be received via a communication interface (e.g. communication interface(s) 450 of FIG. 4).

In an optional second step 202, a gathering of crowdsourcing information (e.g. one or more pieces of crowdsourcing information and/or one or more further pieces of crowdsourcing information; see step 203) is tuned. The step 202 may for instance be performed and/or controlled based on provided (e.g. output) improvement information received in step 201. The improvement information of optional step 201 may for instance be indicative of the one or more control parameters so that the one or more control parameters may for instance be extracted out of the received improvement information. Then, one or more rules and/or modes may for instance be set according to which (in step 203) the gathering of the crowdsourcing information is to be performed and/or controlled.

In a third step 203, one or more pieces of crowdsourcing information and/or one or more further pieces of crowdsourcing information are gathered, e.g. by measuring one or more radio signals sent by one or more radio nodes (e.g. radio nodes 140, 160 of FIG. 1). For instance, the respective signal strengths are gathered. The respective signal strength values may for instance represent values (e.g. unit: dBm) with which the one or more radio signals are observable (e.g. receivable) at a current location the apparatus (e.g. mobile device 130 of FIG. 1) is located at which the one or more pieces of crowdsourcing information and/or one or more further pieces of crowdsourcing information are gathered. Such one or more pieces of crowdsourcing information and/or one or more further pieces of crowdsourcing information may for instance be used to generate one or more radio maps, or partial radio map, or indoor radio map, or a combination thereof. Such radio maps may for instance be used to determine position estimate, e.g. based on a gathered fingerprint indicative of radio signals observable at a certain location which can be derived by comparing the fingerprint to corresponding information stored in such a radio map.

In a fourth step 204, one or more performance indicators are collected. The step 204 may for instance be performed and/or controlled, at least partially, in parallel to the step 203.

In a fifth step 205, the one or more collected performance indicators are provided, e.g. by outputting them, e.g. to at least one apparatus (e.g. server 110 of FIG. 1). The one or more collected performance indicators may for instance be sent directly to the at least one apparatus, or alternatively, to another entity that relays the one or more collected performance indicators to at least one apparatus, to name but a few non-limiting examples (see arrows of the system shown in FIG. 1 as well).

In an optional sixth step 206, the one or more pieces of crowdsourcing information and/or one or more further pieces of crowdsourcing information are provided, e.g. by outputting them, e.g. to at least one apparatus (e.g. server 110 of FIG. 1). For instance, steps 205 and 206 may be performed and/or controlled together, e.g. by providing the crowdsourcing information and e.g. appending the one or more collected performance indicators to the one or more pieces of crowdsourcing information and/or one or more further pieces of crowdsourcing information.

The flowchart 200 may for instance be performed and/or controlled repeatedly, e.g. at least twice. The arrows in flowchart 200 pointing back to the steps 201 to 203 indicate that e.g. after the step 205 or the step 206 was performed, e.g. another iteration of any of the steps 201 to 205 can be performed and/or controlled again. For instance, execution of the flowchart 200 may for instance be started in case the at least one mobile device (e.g. mobile device 130 of FIG. 1) enters a state to take part in crowdsourcing.

Figure 3:
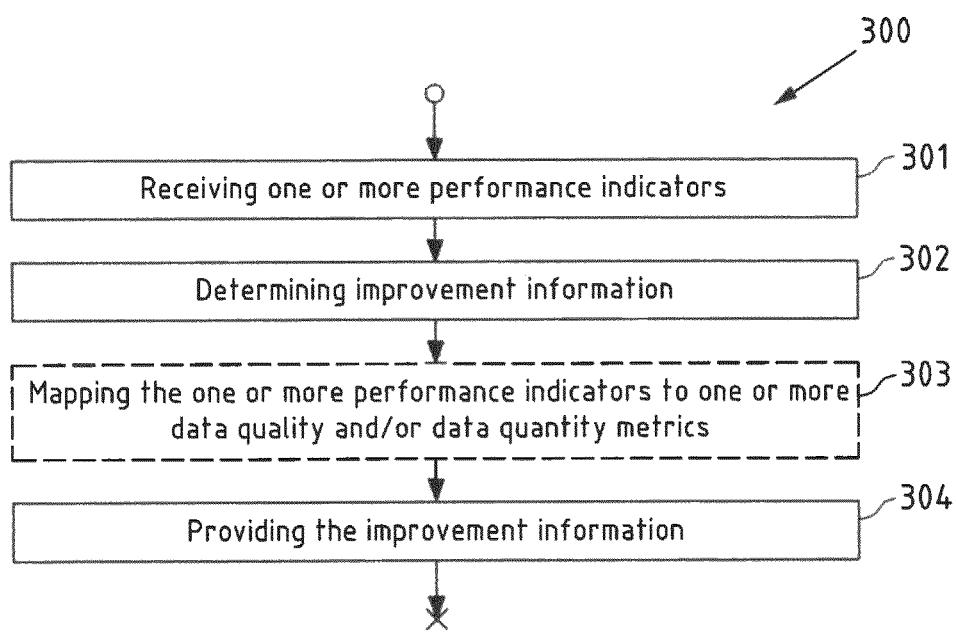
FIG. 3 a flowchart showing an example embodiment of a method according to the second exemplary aspect of the present invention.

FIG. 3 is a flowchart 300 showing an example embodiment of a method according to the second exemplary aspect of the present invention. This flowchart 300 may for instance be performed by a server or server cloud, e.g. server 110 of FIG. 1.

In a first step 301, one or more performance indicators are received, e.g. from one or more mobile devices (e.g. mobile devices 130 of FIG. 1) that collected the one or more performance indicators, e.g. during a gathering of the one or more pieces of crowdsourcing information and/or one or more further pieces of crowdsourcing information (see step 203 of FIG. 2).

In a second step 302, improvement information is determined. The improvement information may for instance be determined based, at least partially, on the one or more performance indicators received in step 301. The improvement information may for instance define one or more control parameters influencing a gathering of one or more pieces crowdsourcing information and/or one or more further pieces of crowdsourcing information (see step 203 of FIG. 2) to be performed and/or controlled by one or more mobile devices (e.g. mobile device(s) 130 of FIG. 1).

In an optional third step 303, the one or more performance indicators of step 301 are mapped to one or more data quality and/or data quantity metrics. Additionally or alternatively, one or more control information (e.g. of which the improvement are indicative of) may be mapped to the received one or more performance indicators of step 301. Such a mapping may for instance be performed and/or controlled by an artificial neural network that may for instance be comprised (e.g. as a module) by the at least one apparatus performing and/or controlling the flowchart 300.

In a fourth step 304, the improvement information are provided, e.g. by outputting them, e.g. to at least one mobile device (e.g. mobile device(s) 130 of FIG. 1). The improvement information may for instance be sent directly to the at least one mobile device, or alternatively, to another entity that relays the improvement information to at least one mobile device, to name but a few non-limiting examples (see arrows of the system shown in FIG. 1 as well).

Figure 4:
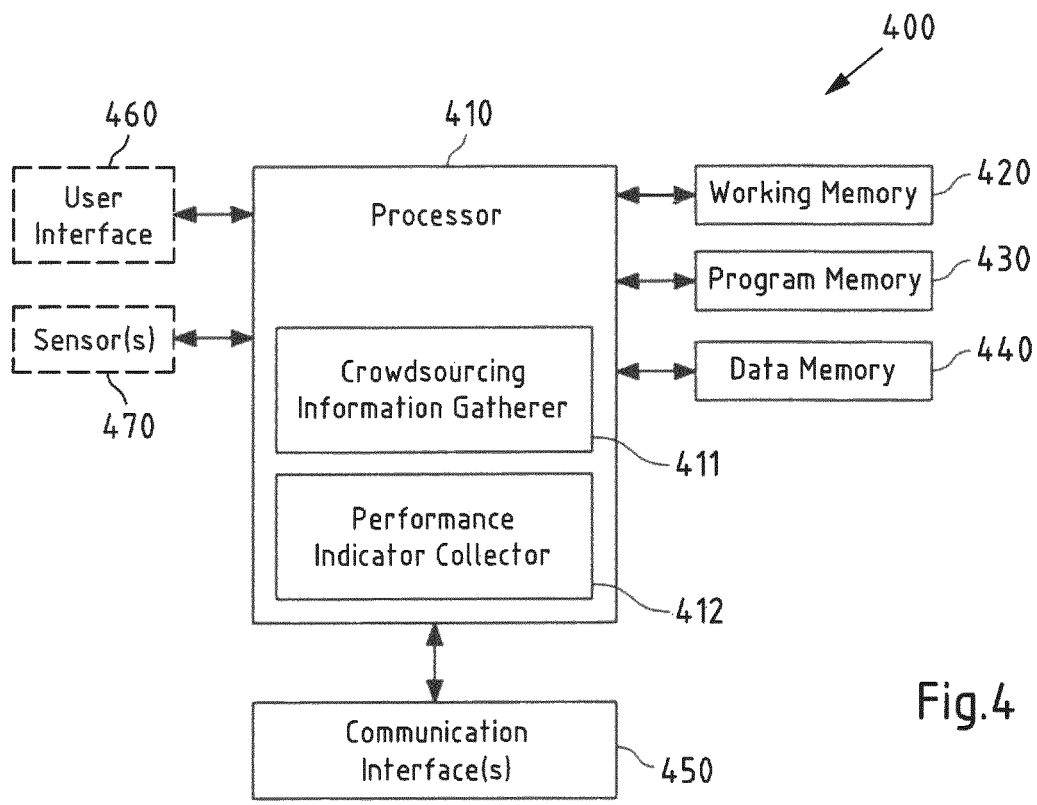
FIG. 4 a schematic block diagram of a mobile device configured to perform the method according to the first exemplary aspect of the present invention.

FIG. 4 is a schematic block diagram of an apparatus 400 according to the first exemplary aspect of the present invention, which may for instance represent the mobile device 130 of FIG. 1.

Apparatus 400 comprises a processor 410, working memory 420, program memory 430, data memory 440, communication interface(s) 450, an optional user interface 460 and an optional sensor(s) 470.

Apparatus 400 may for instance be configured to perform and/or control or comprise respective means (at least one of 410 to 470) for performing and/or controlling the method according to the first exemplary aspect of the present invention. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the first exemplary aspect of the invention of the present invention.

Processor 410 may for instance comprise a crowdsourcing information gatherer 411 as a functional and/or structural unit. Crowdsourcing information gatherer 411 may for instance be configured to gather (e.g. measure) one or more pieces of crowdsourcing information (see step 203 of FIG. 2), e.g. based on one or more radio signals that are observable (e.g. receivable). Alternatively, one or more pieces of crowdsourcing information may be gathered (e.g. measured) by receiving one or more radio signals by the communication interface(s) 450.

Processor 410 may for instance comprise a performance indicator collector 412 as a functional and/or structural unit. Performance indicator collector 412 may for instance be configured to collect (e.g. obtain) one or more performance indicators (see step 204 of FIG. 2)

Processor 410 may for instance further control the memories 420 to 440, the communication interface(s) 450, the optional user interface 460 and the optional sensor(s) 470.

Processor 410 may for instance execute computer program code stored in program memory 430, which may for instance represent a computer readable storage medium comprising program code that, when executed by processor 410, causes the processor 410 to perform the method according to the first exemplary aspect of the present invention.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store one or more pieces of improvement information, one or more control parameters, one or more pieces of crowdsourcing information, one or more performance indicators, or a combination thereof, to name but a few non-limiting examples.

Communication interface(s) 450 enable apparatus 400 to communicate with other entities, e.g. with server 110 of FIG. 1. The communication interface(s) 450 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 400 to communicate with other entities, for instance with one or more radio nodes 140 of FIG. 1.

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise a barometric sensor, e.g. to gather pressure information.

Some or all of the components of the apparatus 400 may for instance be connected via a bus. Some or all of the components of the apparatus 400 may for instance be combined into one or more modules.

FIG. 5 is a schematic block diagram of an apparatus 500 according to an exemplary aspect of the present invention, which may for instance represent the server 110 of FIG. 1.

Apparatus 500 comprises a processor 510, working memory 520, program memory 530, data memory 540, communication interface(s) 550, and an optional user interface 560.

Apparatus 500 may for instance be configured to perform and/or control or comprise respective means (at least one of 510 to 560) for performing and/or controlling the method according to the second exemplary aspect of the present invention. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the second exemplary aspects of the invention of the present invention.

Processor 510 may for instance comprise an improvement information determiner 511 as a functional and/or structural unit. Improvement information determiner 511 may for instance be configured to determine improvement information (see step 302 of FIG. 3).

Processor 510 may for instance comprise an optional mapper 512 as a functional and/or structural unit. Optional mapper 512 may for instance be configured to map (see step 303 of FIG. 3) one or more control information to received one or more performance indicators.

Processor 510 may for instance further control the memories 520 to 540, the communication interface(s) 550, and the optional user interface 560.

Processor 510 may for instance execute computer program code stored in program memory 530, which may for instance represent a computer readable storage medium comprising program code that, when executed by processor 510, causes the processor 510 to perform the method according to the second exemplary aspect of the present invention.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 540 may for instance store one or more pieces of improvement information, one or more control parameters, one or more pieces of crowdsourcing information, one or more performance indicators, or a combination thereof, to name but a few non-limiting examples.

Communication interface(s) 550 enable apparatus 500 to communicate with other entities, e.g. with mobile device 130 of FIG. 1. The communication interface(s) 550 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 500 to communicate with other entities, for instance with one or more radio nodes 140 of FIG. 1.

User interface 560 is optional and may comprise a display for displaying information to a user and/or an input device (e.g. a keyboard, keypad, touchpad, mouse, etc.) for receiving information from a user.

Some or all of the components of the apparatus 500 may for instance be connected via a bus. Some or all of the components of the apparatus 500 may for instance be combined into one or more modules.

The following embodiments shall also be considered to be disclosed:

Embodiment 1

A mobile device comprising at least one processor and at least one memory including computer program code, the at least one memory and the computer program code configured to, with the at least one processor, cause the apparatus to at least perform:
 gathering one or more pieces of crowdsourcing information indicative of one or more positions at which the at least one mobile device is located during the gathering;
 collecting one or more performance indicators indicative of measurable information associated with the gathering of the one or more pieces of crowdsourcing information, wherein the one or more performance indicators enable an evaluation of the gathering of the one or more pieces of crowdsourcing information; and
 providing the collected one or more performance indicators.

Embodiment 2

The mobile device according to embodiment 1, the at least one memory and the computer program code configured to, with the at least one processor, cause the apparatus further to perform:
 receiving improvement information indicative of one or more control parameters associated with a gathering of the one or more further pieces of crowdsourcing information;
  tuning the gathering of the one or more pieces of crowdsourcing information based at least partially on the received improvement information.

Embodiment 3

The mobile device according to embodiment 2, wherein the received improvement information is based on the collected one or more performance indicators.

Embodiment 4

The mobile device according to any of the preceding embodiments, wherein the collecting of the one or more performance indicators is performed at least partially in parallel to the gathering of the one or more pieces of crowdsourcing information.

Embodiment 5

The mobile device according to any of the preceding embodiments, wherein the method is performed and/or controlled repeatedly.

Embodiment 6

The mobile device according to any of the preceding embodiments, wherein the one or more pieces of crowdsourcing information and/or the one or more further pieces of crowdsourcing information are indicative of one or more parameters associated with the one or more radio signals and/or one or more radio nodes that sent the one or more radio signals, wherein the one or more pieces of crowdsourcing information and/or the one or more further pieces of crowdsourcing information are gathered based, at least in part, on one or more radio signals observable at one or more certain locations at which the at least one mobile device is located.

Embodiment 7

The mobile device according to any of the preceding embodiments, wherein the one or more performance indicators comprise one or more of the following:
 i) time of the gathering of the one or more pieces of crowdsourcing information and/or the one or more further pieces of crowdsourcing information;
 ii) frequency of the gathering of the one or more pieces of crowdsourcing information and/or the one or more further pieces of crowdsourcing information;
 iii) data amount associated with the gathering of the one or more pieces of crowdsourcing information and/or the one or more further pieces of crowdsourcing information;
 iv) energy consumption associated with the gathering of the one or more pieces of crowdsourcing information and/or the one or more further pieces of crowdsourcing information;
 v) motion of the at least one mobile device during the gathering of the one or more pieces of crowdsourcing information and/or the one or more further pieces of crowdsourcing information;
 vi) locations at which the gathering of the one or more pieces of crowdsourcing information and/or the one or more further pieces of crowdsourcing information took place;
 vii) a rule and/or mode according to which the one or more pieces of crowdsourcing information and/or the one or more further pieces of crowdsourcing information were gathered; and
 viii) one or more pieces of state information indicative of one or more system state parameters of the at least one mobile device.

Embodiment 8

The mobile device according to any of the preceding embodiments, the at least one memory and the computer program code configured to, with the at least one processor, cause the apparatus further to perform:
 providing the one or more pieces crowdsourcing information, wherein the collected one or more performance indicators are provided by being appended to the one or more pieces of crowdsourcing information.

Embodiment 9

An apparatus comprising at least one processor and at least one memory including computer program code, the at least one memory and the computer program code configured to, with the at least one processor, cause the apparatus to at least perform:
  receiving one or more performance indicators indicative of measurable information associated with a gathering of one or more pieces of crowdsourcing information, wherein the one or more performance indicators are intended for enabling an evaluation of the gathering of the one or more pieces of crowdsourcing information;
  determining improvement information indicative of one or more control parameters associated with a gathering of the one or more further pieces of crowdsourcing information, wherein the improvement information is determined based, at least partially, on the one or more performance indicators; and
  providing the improvement information.

Embodiment 10

The apparatus according to embodiment 9, wherein the improvement information represents one or more improvements or criteria enabling the gathering of the one or more pieces of crowdsourcing information (e.g. performed by the at least one mobile device according to any of the embodiments 1 to 8) or a further gathering of one or more pieces of crowdsourcing information (e.g. performed by the at least one mobile device according to any of the embodiments 1 to 8) to be tuned.

Embodiment 11

The apparatus according to any of the embodiments 8 to 10, wherein the improvement information is determined based on an artificial neural network enabling the determining of the improvement information.

Embodiment 12

The apparatus according to any of the embodiments 8 to 11, wherein the improvement information enables a tuning of the gathering of the one or more pieces of crowdsourcing information.

Embodiment 13

The apparatus according to embodiment 10, wherein the determining of the improvement information further comprises:
  mapping the one or more performance indicators to one or more data quality and/or data quantity metrics,
  wherein the improvement information is determined based on an evaluation of the data quality and/or data quantity metrics associated with the one or more performance indicators.

Embodiment 14

A mobile device comprising at least one processor and at least one memory including computer program code, the at least one memory and the computer program code configured to, with the at least one processor, cause an apparatus at least to perform and/or control the method of any of the embodiments 1 to 7.

Embodiment 15

An apparatus comprising at least one processor and at least one memory including computer program code, the at least one memory and the computer program code configured to, with the at least one processor, cause an apparatus at least to perform and/or control the method of any of the embodiments 8 to 13.

Embodiment 16

A system, comprising:
  at least one mobile device according to any of the embodiments 1 to 7, or embodiment 14; and
  at least one apparatus according to any of the embodiments 8 to 13, or embodiment 16.

Embodiment 17

The system according to embodiment 16, wherein the at least one mobile device and the at least one apparatus are configured to perform and/or control the method according to any of the claims 1 to 7, and the method according to any of the claims 8 to 13 together.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, performed by at least one mobile device, comprising:
    gathering one or more pieces of crowdsourcing information indicative of at least one or more positions at which the at least one mobile device is located during the gathering;
    collecting one or more performance indicators indicative of measurable information associated with the gathering of the one or more pieces of crowdsourcing information, wherein the one or more performance indicators enable an evaluation of the gathering of the one or more pieces of crowdsourcing information; and
    providing the collected one or more performance indicators;
    receiving improvement information (a) indicative of one or more control parameters associated with a gathering of one or more further pieces of crowdsourcing information that are to be gathered subsequent to the one or more pieces of crowdsourcing information and (b) determined at least in part on the one or more performance indicators; and
    tuning the gathering of the one or more further pieces of crowdsourcing information based at least partially on the received improvement information, wherein the one or more performance indicators comprise one or more of:
    i) time of the gathering of the one or more pieces of crowdsourcing information;
    ii) energy consumption associated with the gathering of the one or more pieces of crowdsourcing information;
    iii) motion of the at least one mobile device during the gathering of the one or more pieces of crowdsourcing information;
    iv) memory consumption associated with the gathering of the one or more pieces of crowdsourcing information;
    v) bandwidth consumption associated with the gathering of the one or more pieces of crowdsourcing information; or
    vi) screen state during the gathering of the one or more pieces of crowdsourcing information.

2. The method of claim 1, wherein the collecting of the one or more performance indicators is performed at least partially in parallel to the gathering of the one or more pieces of crowdsourcing information.

3. The method of claim 1, wherein the received improvement information is based on the collected one or more performance indicators.

4. The method of claim 1, wherein the collecting of the one or more performance indicators is performed at least partially in parallel to the gathering of the one or more further pieces of crowdsourcing information.

5. The method of claim 1, wherein the one or more pieces of crowdsourcing information and/or the one or more further pieces of crowdsourcing information are indicative of one or more parameters associated with one or more radio signals and/or one or more radio nodes that sent the one or more radio signals, wherein the one or more pieces of crowdsourcing information and/or the one or more further pieces of crowdsourcing information are gathered based, at least in part, on the one or more radio signals observable at one or more certain locations at which the at least one mobile device is located.

6. The method of claim 1, wherein the one or more performance indicators comprise one or more of the following:
    i) said time of the gathering of the one or more pieces of crowdsourcing information and/or the one or more further pieces of crowdsourcing information;
    ii) frequency of the gathering of the one or more pieces of crowdsourcing information and/or the one or more further pieces of crowdsourcing information;
    iii) data amount associated with the gathering of the one or more pieces of crowdsourcing information and/or the one or more further pieces of crowdsourcing information;
    iv) said energy consumption associated with the gathering of the one or more pieces of crowdsourcing information and/or the one or more further pieces of crowdsourcing information;
    v) said motion of the at least one mobile device during the gathering of the one or more pieces of crowdsourcing information and/or the one or more further pieces of crowdsourcing information;
    vi) locations at which the gathering of the one or more pieces of crowdsourcing information and/or the one or more further pieces of crowdsourcing information took place;
    vii) a rule and/or mode according to the one or more pieces of crowdsourcing information and/or the one or more further pieces of crowdsourcing information were gathered; and
    viii) one or more pieces of state information indicative of one or more system state parameters of the at least one mobile device.

7. The method of claim 1, further comprising:
    providing the crowdsourcing information, wherein the collected one or more performance indicators are provided by being appended to the one or more pieces of crowdsourcing information and/or the one or more further pieces of crowdsourcing information.

8. The method of claim 1, wherein tuning the gathering of the one or more further pieces of crowdsourcing information based at least partially on the received improvement information comprises:
    extracting the one or more control parameters out of the received improvement information; and
    setting one or more rules and/or modes based on the one or more control parameters.

9. A method, performed by at least one apparatus, comprising:
    receiving one or more performance indicators indicative of measurable information associated with a gathering of one or more pieces of crowdsourcing information, wherein the one or more performance indicators enable an evaluation of the gathering of the one or more pieces of crowdsourcing information;

determining improvement information indicative of one or more control parameters associated with a gathering of one or more further pieces of crowdsourcing information, wherein the improvement information is determined based, at least partially, on the one or more performance indicators, wherein the improvement information is determined based on a machine learning-trained model enabling the determining of the improvement information indicative of the one or more control parameters configured to modify at least one of an amount or a quality of the one or more further pieces of crowdsourcing information compared to the one or more pieces of crowdsourcing information, and wherein the one or more performance indicators comprise one or more of:
  i) time of the gathering of the one or more pieces of crowdsourcing information,
  ii) energy consumption associated with the gathering of the one or more pieces of crowdsourcing information,
  iii) motion of the at least one mobile device during the gathering of the one or more pieces of crowdsourcing information,
  iv) memory consumption associated with the gathering of the one or more pieces of crowdsourcing information,
  v) bandwidth consumption associated with the gathering of the one or more pieces of crowdsourcing information, or
  vi) screen state during the gathering of the one or more pieces of crowdsourcing information; and
providing the improvement information.

10. The method of claim 9, wherein the improvement information represents one or more improvements or criteria enabling the gathering of one or more further pieces of crowdsourcing information to be tuned.

11. The method of claim 9, wherein the determining of the improvement information further comprises:
  mapping the one or more performance indicators to one or more data quality and/or data quantity metrics,
  wherein the improvement information is determined based on an evaluation of the data quality and/or data quantity metrics associated with the one or more performance indicators in accordance with the mapping.

12. The method of claim 9, wherein the machine learning-trained model is configured to map at least one of the one or more performance indicators to one or more of data quality and/or data quantity metrics.

13. An apparatus comprising at least one processor and at least one memory including computer program code, the at least one memory and the computer program code configured to, with the at least one processor, cause the apparatus to at least perform:
  gathering one or more pieces of crowdsourcing information indicative of at least one or more positions at which the apparatus is located during the gathering;
  collecting one or more performance indicators indicative of measurable information associated with the gathering of the one or more pieces of crowdsourcing information, wherein the one or more performance indicators enable an evaluation of the gathering of the one or more pieces of crowdsourcing information; and
  providing the collected one or more performance indicators;
  receiving improvement information (a) indicative of one or more control parameters associated with a gathering of one or more further pieces of crowdsourcing information that are to be gathered subsequent to the one or more pieces of crowdsourcing information and (b) determined at least in part on the one or more performance indicators; and
  tuning the gathering of the one or more further pieces of crowdsourcing information based at least partially on the received improvement information, wherein the one or more performance indicators comprise one or more of:
    i) time of the gathering of the one or more pieces of crowdsourcing information;
    ii) energy consumption associated with the gathering of the one or more pieces of crowdsourcing information;
    iii) motion of the at least one mobile device during the gathering of the one or more pieces of crowdsourcing information;
    iv) memory consumption associated with the gathering of the one or more pieces of crowdsourcing information;
    v) bandwidth consumption associated with the gathering of the one or more pieces of crowdsourcing information; or
    vi) screen state during the gathering of the one or more pieces of crowdsourcing information.

14. The apparatus of claim 13, wherein the at least one memory and the computer program code are configured to, with the at least one processor, cause the apparatus to collect the one or more performance indicators at least partially in parallel to the gathering of the one or more pieces of crowdsourcing information.

15. The apparatus of claim 13, wherein the received improvement information is based on the collected one or more performance indicators.

16. The apparatus of claim 13, wherein the at least one memory and the computer program code are configured to, with the at least one processor, cause the apparatus to collect the one or more performance indicators at least partially in parallel to the gathering of the one or more further pieces of crowdsourcing information.

17. The apparatus of claim 13, wherein the one or more pieces of crowdsourcing information and/or the one or more further pieces of crowdsourcing information are indicative of one or more parameters associated with the one or more radio signals and/or one or more radio nodes that sent the one or more radio signals, wherein the one or more pieces of crowdsourcing information and/or the one or more further pieces of crowdsourcing information are gathered based, at least in part, on the one or more radio signals observable at one or more certain locations at which the apparatus is located.

18. The apparatus of claim 13, wherein the one or more performance indicators comprise one or more of the following:
  i) said time of the gathering of the one or more pieces of crowdsourcing information and/or the one or more further pieces of crowdsourcing information;
  ii) frequency of the gathering of the one or more pieces of crowdsourcing information and/or the one or more further pieces of crowdsourcing information;
  iii) data amount associated with the gathering of the one or more pieces of crowdsourcing information and/or the one or more further pieces of crowdsourcing information;
  iv) said energy consumption associated with the gathering of the one or more pieces of crowdsourcing information and/or the one or more further pieces of crowdsourcing information;

v) said motion of the apparatus during the gathering of the one or more pieces of crowdsourcing information and/or the one or more further pieces of crowdsourcing information;
vi) locations at which the gathering of the one or more pieces of crowdsourcing information and/or the one or more further pieces of crowdsourcing information took place;
vii) a rule and/or mode according to the one or more pieces of crowdsourcing information and/or the one or more further pieces of crowdsourcing information were gathered; and
viii) one or more pieces of state information indicative of one or more system state parameters of the apparatus.

19. The apparatus of claim 13, wherein the at least one memory and the computer program code are further configured to, with the at least one processor, cause the apparatus to:
provide the crowdsourcing information, wherein the collected one or more performance indicators are provided by being appended to the one or more pieces of crowdsourcing information and/or the one or more further pieces of crowdsourcing information.

\* \* \* \* \*